(12) United States Patent
Rowland et al.

(10) Patent No.: US 10,515,282 B1
(45) Date of Patent: Dec. 24, 2019

(54) MULTI-HAND INTERFACE METHOD

(71) Applicant: The United States of America as represented by the Secretary of the Navy, Newport, RI (US)

(72) Inventors: Raymond J Rowland, Noank, CT (US); Matthew C Puterio, Newport, RI (US); Matthew J Gilchrest, Warwick, RI (US); James M Kasischke, Portsmouth, RI (US)

(73) Assignee: The United States of America as represented by the Secretary of Navy

( * ) Notice: Subject to any disclaimer, the term of this patent is extended or adjusted under 35 U.S.C. 154(b) by 156 days.

(21) Appl. No.: 15/945,800

(22) Filed: Apr. 5, 2018

(51) Int. Cl.
*G06K 9/00* (2006.01)

(52) U.S. Cl.
CPC ..... *G06K 9/00892* (2013.01); *G06K 9/00013* (2013.01); *G06K 9/00087* (2013.01); *G06K 9/00288* (2013.01); *G06F 2203/04104* (2013.01)

(58) Field of Classification Search
CPC .... G06F 3/04883; G06F 3/0488; G06F 3/017; G06F 3/041
See application file for complete search history.

(56) References Cited

U.S. PATENT DOCUMENTS

| | | | | | |
|---|---|---|---|---|---|
| 7,663,607 | B2 * | 2/2010 | Hotelling | ............... | G06F 3/0416 345/173 |
| 7,840,912 | B2 * | 11/2010 | Elias | ................... | G06F 3/04883 715/863 |
| 8,487,888 | B2 * | 7/2013 | Wigdor | ............... | G06F 3/04883 345/173 |
| 8,856,543 | B2 * | 10/2014 | Geiger | .................... | G06F 21/32 713/186 |
| 9,035,891 | B2 * | 5/2015 | Deluca | .................... | G06F 3/041 178/18.01 |
| 9,104,308 | B2 * | 8/2015 | Au | ........................ | G06F 3/04883 |
| 9,141,284 | B2 * | 9/2015 | Sands | ..................... | G06F 3/042 |

\* cited by examiner

*Primary Examiner* — Yosef Kassa
(74) *Attorney, Agent, or Firm* — James M. Kasischke; Michael P. Stanley

(57) ABSTRACT

A method for multi-user recognition for a multi-touch display is provided. The method identifies a user by using metrics from a hand touch on the display. A hand based menu system is provided on the display in response. Menu system can be oriented in accordance with the hand touch. Stored user preferences can be retrieved for the identified user. The display can recognize an additional hand from the same user or an additional user's hand. These can be used to provide a collaborative display. Optionally additional metrics can be utilized for user identification.

16 Claims, 5 Drawing Sheets

MULTI-HAND INTERFACE METHOD

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is directed to a menu system for a multi-touch touch screen general purpose computer system.

(2) Description of the Prior Art

Multi-touch computer screens provide for highly versatile data and command entry. Typically, these are touch screens that are enabled to capture multiple touches and can identify the location of each touch on the screen surface. This can be by a resistive touchscreen, a surface acoustic wave touch screen, capacitive screen, infrared grid screen, infrared acrylic projection screen or the like. Output is available from the screen by known technologies including liquid crystal display systems, micro-capsule or micro-particle systems, light emitting diode systems, cathode ray tube systems, plasma systems and the like. A multi-touch display can be any combination of these technologies associated with a general purpose computer. A general purpose computer or processor can include all elements commonly associated with a computer such as input/output devices, memory, central processing, numerical processing, long-term storage and the like as commonly used. For simplicity, the term "processor" will be used to describe a general purpose computer having all of the usual components.

Large scale multi-touch displays have been developed. These are often used as an interactive tabletop or wall display that can be used for a variety of purposes. With these displays, there is a question concerning communication with the device for commands and data entry. It is well known to have a menu system at a particular location on the display such as along the top, bottom or sides. A user can select the particular location or locations for the menus. Software can also select a menu location with relation to an action point or cursor. Menus can also float and be repositioned by user action.

With a display having a major dimension greater than 1.5 meters, fixed menus can often be out of user reach. Floating menus can be used in this case. One or more menus in a floating menu system can be positioned and repositioned by the user during use. This can present a problem with a multi-use tabletop display because the display could be upside down with respect to the primary user.

U.S. Pat. No. 9,104,308 to Au et al. solves some of these problems. It provides a finger registration system for a multi-touch display. This system allows recognition that finger positions represent a hand on the display. Techniques are taught that differentiate other multi-touches from those of a hand. The system can also differentiate left and right hands and utilize hand position to establish orientation. It further provides for a menu system having a command associated with each finger or nearby each finger. Au et al. also teach a virtual keyboard positioned relative to recognized hand sizes and configurations. Au et al. teach using hand locations and orientations to distinguish different users, but Au et al. do not teach recognition of specific individuals.

Biometrics are a well-known method for establishing user identities. Multiple biometrics can be gathered to establish an identity with some biometric measures providing greater certainty than others. These biometrics include facial recognition, voice recognition, fingerprint analysis, iris analysis, retinal analysis. Other user information such as a specific voice print, password or personal identification number can further identify a user. Once a user identity has been established, it is known to use this identity for loading preferences into a computer system.

Given the progression of this technology, there is a need for multi-user collaborative displays and interfaces. The prior art provides for single-user identification and menu systems, but it does not provide for collaborative multi-user interfaces. Thus, there is a need for an interface that can be used to recognize a single user and then be used by additional users.

There are further capabilities that can be achieved utilizing hand recognition on multi-touch displays.

SUMMARY OF THE INVENTION

It is a first object of the present invention to provide a system allowing multiple users on a multi-touch display.

Another object is to provide a system that conveniently displays menus for multi-touch display users.

Yet another object is to allow distinct users to access and collaboratively use a multi-touch display.

Accordingly, there is provided a method for multi-user recognition for a multi-touch display. The method identifies a user by using metrics from a hand touch on the display. A hand based menu system is provided on the display in response. Menu system can be oriented in accordance with the hand touch. Stored user preferences can be retrieved for the identified user. The display can recognize an additional hand from the same user or an additional user's hand. These can be used to provide a collaborative display. Optionally additional metrics can be utilized for user identification.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
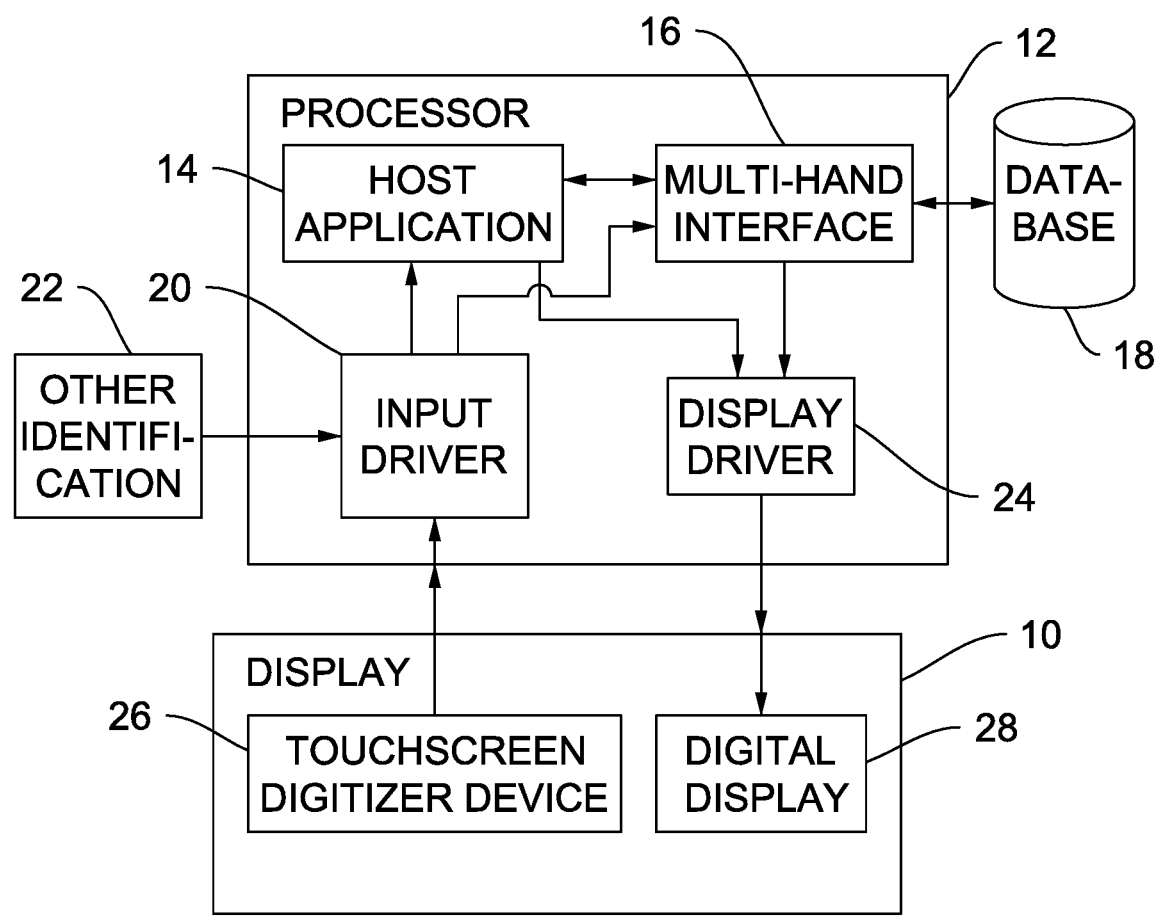
FIG. 1 is a diagram providing a conceptual view of hardware and software elements.

FIG. 1 provides a conceptual view of the interaction between hardware and software elements for practicing the method described herein. A multi-touch display 10 is joined to a processor 12. Host application 14 is the particular user application that is executed as software on processor 12. The methods herein can be embodied in multi-hand interface 16 which operates as software on processor 12. Multi-hand interface 16 is the application programming interface (API) that provides communication with host application 14. Multi-hand interface 16 is joined to database 18 for user authentication and preference data. An input driver 20 is implemented on processor 12 for handling inputs from display 10 and other identification means 22. Other identification means 22 is optional. Need for this device can be dictated by the security constraints for the application. A display driver 24 is joined to receive output information from host application 14 and multi-hand interface 16. This allows the control of multiple host applications 14 and allows multi-hand interface software 16 to open and close applications 44. Display driver 24 in processor 12 formats video signals from multi-hand interface software 16 and host application 14 for digital display portion 28 of multi-touch display 10.

Display 10 can be any display that is configured with a multi-touch, touchscreen digitizer device 26. Touchscreen digitizer device 26 represents the portion of multi-touch display 10 that receives touch positions from a user and encodes these touch positions. Touchscreen digitizer device 26 provides these encoded touch positions to input driver 20 operating within processor 12. Touch screen driver 26 provides touch coordinates to both the host application 14 and to multi-hand interface software 16. Thus, multi-hand interface software 16 can be configured for use with a variety of different host applications. Display 10 can be multiple displays that are linked together. Display 10 has a digital display component 28 capable of displaying content from display driver 24.

Database 18 is capable of storing new and previously identified user biometrics and other recognition information. These can include various hand dimensions such as length, width, area, finger separation and the like. Other user data or information can also be stored in database 18. This can include user preferences, menus, permissions, identifying data, and the like. Database 18 can be located remotely from processor 12.

The other identification means 22 can be a biometric device such as a camera, a microphone, an eye scanner, a fingerprint reader or any other biometric device, or this device can be another identification device such as a card reader or radio frequency identification device.

Figure 2:
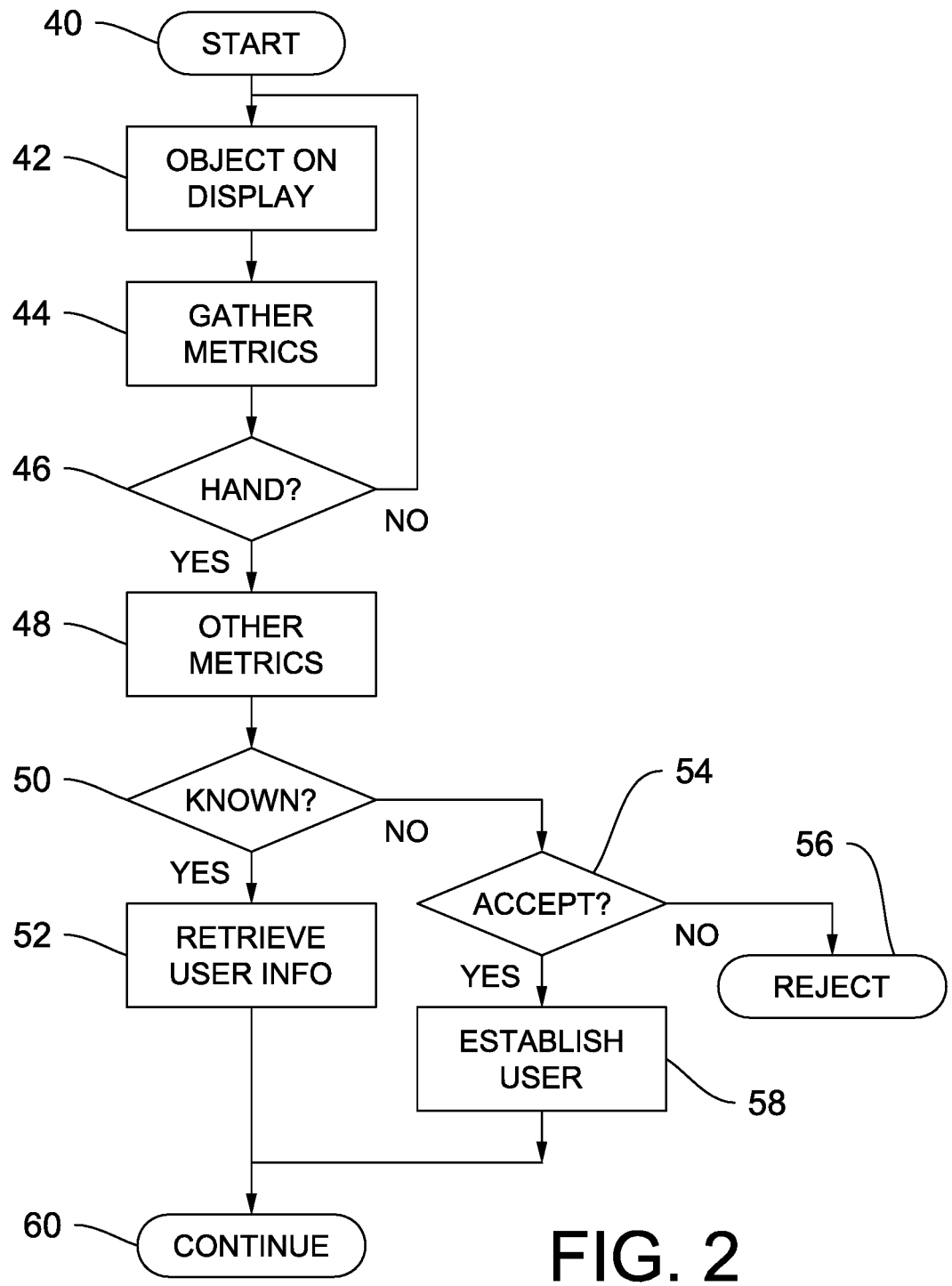
FIG. 2 is a flow chart showing initial user logging and validation.

FIG. 2 provides a flowchart an embodiment showing procedures for initial user use. These procedures will be described in conjunction with the apparatus given in FIG. 1. At start 40, processor 10 and display 12 are awaiting invocation of the method. In the object on display 42 step, touchscreen digitizer device 26 indicates that display 10 senses a touch. This touch could be from a hand press or another object on multi-touch display 10. A gather metrics 44 step gathers metrics describing the touch from touchscreen digitizer device 26. These metrics include the coordinates of the locations being touched. Gathered metrics are analyzed in step 46 by processor 10 multi-hand interface 16 to determine if the locations being touched represent a hand touch. This can be performed by analyzing the area of the touch, the presence of fingers and a thumb, and the length and breadth of the touch. When processor 10 determines that touch does not represent a hand, the touch can be ignored and the system can continue to await invocation.

When step 46 indicates that the touch represents a hand, the method can utilized hand metrics obtained in step 44 to recognize the hand press as being from a previously recognized or known user. These hand metrics include hand configuration (right or left), hand orientation, finger and thumb lengths, finger and thumb lengths relative to one another, missing digits, hand width, contact areas, contact positions, palm position, palm area, and other metrics such as multi-touch display location.

Optionally, the method proceeds to step 48 to collect other non-hand metrics to determine if the hand is associated with a known user. These other metrics can be collected by other identification device 22. The other metrics can include any other input known in the art for identifying a user including facial recognition, fingerprint recognition, audio recognition, password entry, card entry, iris scanning, radio frequency identification, or the like. In step 50, processor 12 determines if the combined hand metrics and other metrics represent a previously recognized or known user. Known users are those users who have been previously registered in some manner and have records in database 18. Processor 12 can use probabilistic analysis to determine if the user is sufficiently similar to a known user, or it can use affirmative means such as by an identification card to identify the user. If affirmative means are used, hand metrics can be used as an additional authentication factor. Additional authentication factors can be obtained as required by security concerns.

If processor 12 determines that the touch represents a known user, other user data can be retrieved from database 18 in step 52. If processor 12 determines that the touch is from an unknown user, the user can be accepted or rejected based on the hand metrics and other metrics in step 54. Rejected users are excluded from system access in step 56. User information is established in step 58 for accepted users. Step 58 can include establishing obtaining necessary user information and preferences for the user to be established as a known user. The user information and preferences can be saved in database 18. Processing continues for known and accepted users in step 60.

Figure 3:
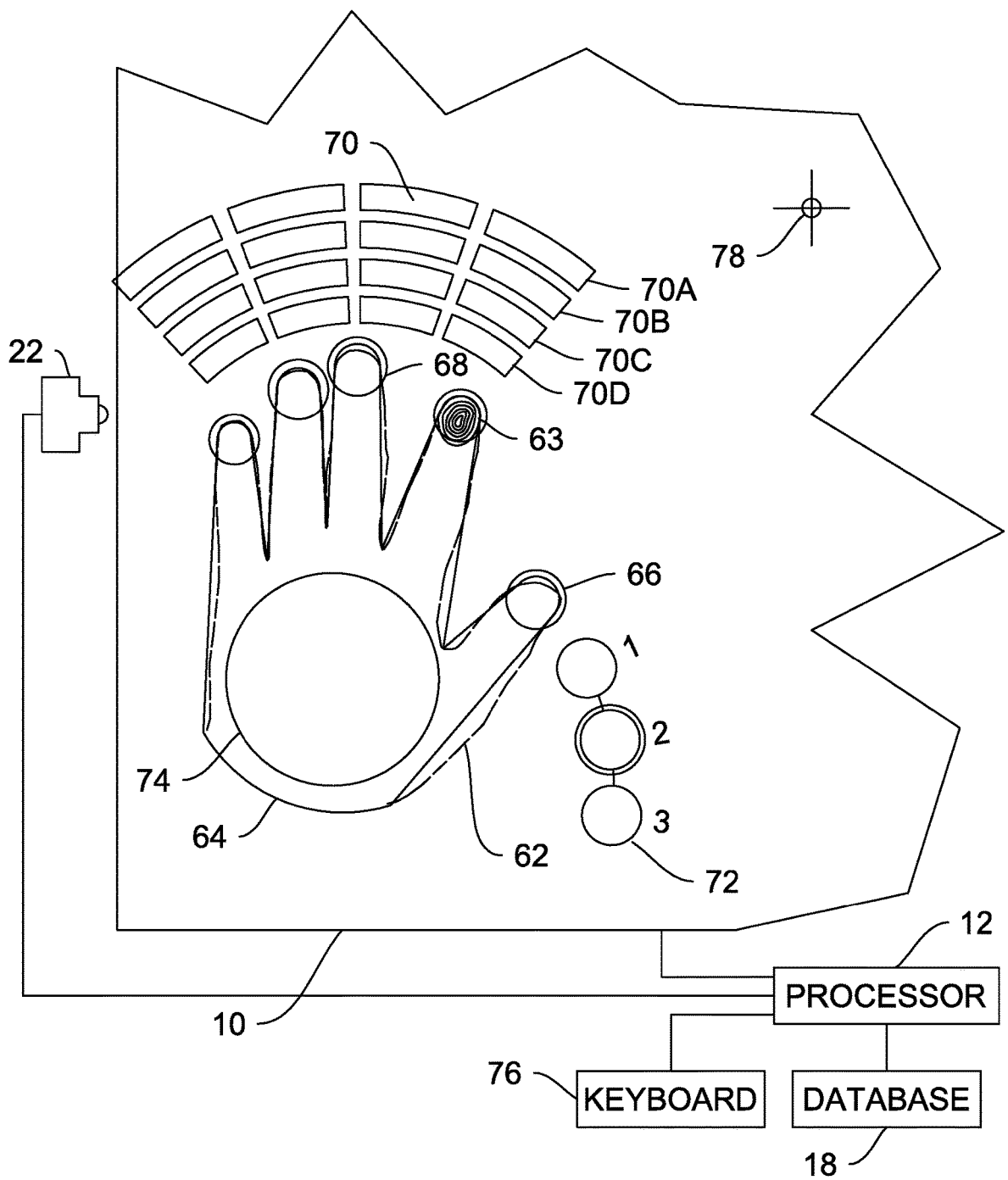
FIG. 3 is a diagram of an embodiment of the multi-hand interface.

FIG. 3 provides an embodiment of one screen layout given by the multi-hand interface. Multi-touch display 10 is joined to a processor 12. Processor 12 receives input from display 10, database 18, and other identification device 22. The multi-hand interface is invoked when a user places a hand 62 (shown with dashed lines) on the display 10. Display 10 reads the hand metrics and provides these metrics to processor 12. Processor 12 analyzes these positions, as described above, to determine if the set of positions indicates a hand or if some other object is indicated. Hand 62 can either be a right hand or a left hand. Processor 12 can recognize whether hand 62 is a right hand or left hand from finger and thumb positions. Orientation of hand 62 can also be detected from finger and thumb positions. Hand metrics can be used to help identify the user. Some displays can be configured to read one or more fingerprints directly from the screen such as shown at location 63. This can serve as a form of biometric identification.

After recognizing a user or establishing a new user, processor 12 can cause display 10 to display a visual indication that a hand 62 has been recognized. This visual indication can be a visual indicator of a hand 64, a thumb indicator 66, and individual finger indicators 68, or a combination of these. These visual indicators are preferably sized to the specific dimensions of the detected hand 62. Processor 12 can also cause display 10 to display a plurality of finger pads 70 in response to stored instructions or data saved in database 16. Finger pads 70 can include symbols to indicate the associated functionality. Thumb pads 72 can also be displayed by processor 12. Finger pads 70 and thumb pads 72 can be positioned on display 10 by processor 12 according to detected dimensions or prerecorded user preferences. Processor 12 can be programmed to provide a specific menu or take a specific action when processor 12 senses a finger pad 70 touch or a thumb pad 72 touch. Pads 70 and 72 can also be shown with a visual indication such as a color change, a brightness change or a change in another characteristic to indicate that the pad is activated or inactivated. Pads 70 and 72 can be configured as buttons that need to be held for action, on/off buttons, radio buttons, or any other button type known in the art. Multiple finger pads 70A, 70B, 70C, 70D can be associated with each finger 68.

Processor 12 can further identify a palm location from the configuration of the finger and thumb positions. The palm location can be used to identify a virtual palm button 74. Like pads 70 and 72 palm button 74 can have a visual indication of state.

Once processor 12 recognizes a hand 62, the hand position can be maintained for a predetermined period of time in processor memory and on display 10 in order to let a user move fingers to press a finger pad 70 or thumb pad 72. After the predetermined period of time elapses, processor 12 can adjust the recognized hand position 62 or remove the recognized position. Hand 62 position can also be dragged across the display 10 for readjustment. This readjustment is accompanied by readjustment of visual indications for the hand 62, thumb 66, and/or fingers 68.

Input to display 10 is not limited to use of the hand menu system and touches on the multi-touch display 10. An external input means or multiple input means 76 such as a keyboard, mouse, touchpad, joystick, wheel selector or the like can be joined to processor 12.

In this embodiment, thumb pad 72 is configured as a sliding indicator with labels to one side. Different thumb slide positions can change enhanced finger pad options. Use of a sliding indicator, allows the thumb return to a resting position after selecting a setting on the sliding indicator. Selected position can be indicated visually as at label "2". A pointer tool 78 is also configured in this embodiment. Tool 76 is can be indicated at a location by the user's other hand. Tool 78 can be initially indicated at an ergonomic location and repositioned to a desired location by a touch or a drag from the user's non-menu hand. Tool 78 can be a pointer, a selector, an icon, a drawing tool, an anchor or any other tool known in the computer user interface art. Tool 78 functions can be selected by finger pads 70, thumb pads 72, input means 76, or a combination of these controls.

Figure 4:
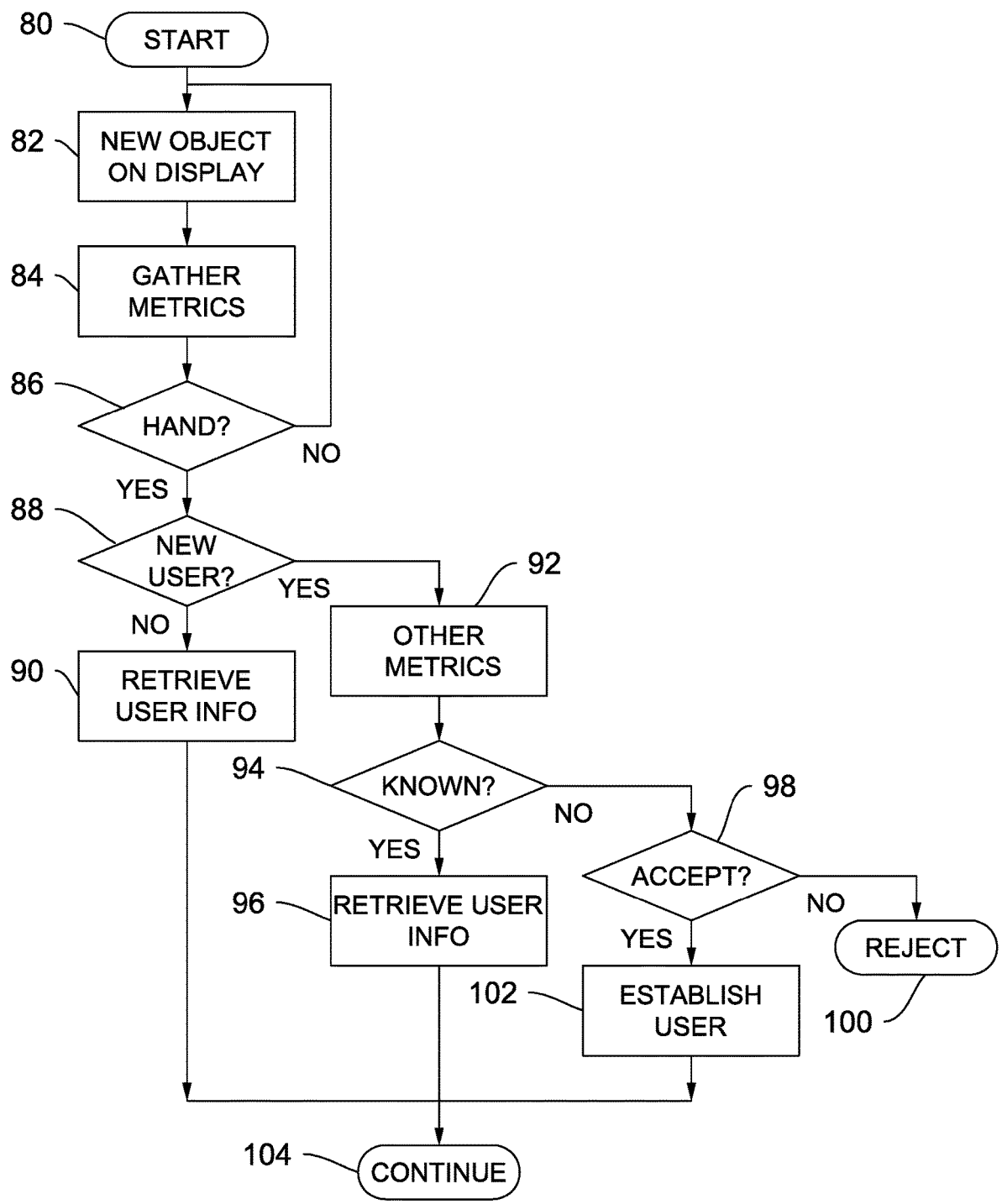
FIG. 4 is a flow chart showing logging for an additional hand.

In order to be useful as a multi-user interface, the system must account for the introduction of additional hands on the multi-touch display 10. FIG. 4 provides a flow chart of this procedure. At start 80, processor 12 and display 10 can be executing other routines. A new object is presented on multi-touch display 10 in step 82, and this is communicated to processor by touchscreen digitizer device 26 of FIG. 1. Communicated information constitutes multi-touch display locations or coordinates of the locations being touched. These coordinates can be turned into metrics for further analysis in step 84. In step 86, processor 12 identifies the metrics as a hand press. This can be performed by the same means as in step 46 of FIG. 2. If the metrics do not represent a hand press then the system awaits further input. The system proceeds to step 88 if the metrics represent a hand press.

In step 88, the system analyzes the hand press to determine if the hand press represents a new user or a previously recognized user by analyzing the hand metrics. The system can determine that the hand press represents a new user if it is the same hand configuration (right or left) as all of the other hands present on the display. It can also be determined that the hand press represents a new user if the multi-touch locations or coordinates of the press are too far from the coordinates of previously logged hand presses. Orientation of the new hand press can also be used in making the determination. Some hand orientations can be understood to represent new users because they would be physically uncomfortable to an existing user.

Step 88 can also affirmatively identify a new hand press as an additional hand of an existing user. This can be done if the new hand press is located close to the existing hand press, and the new hand represents the opposite hand configuration. For example, if the system has recognized a left hand, a right hand can be recognized as belonging to the same user if its coordinates are proximate to the right side of the recognized left hand. A gesture can also be used to recognize a user's additional hand. This can include placing the additional hand in contact with the original hand and moving it away. Input from other identification device 22 can also be used to link an additional hand with a previous hand. This can be by visual techniques when device 22 is a camera or by an audible cue if device 22 is a microphone. Once an additional hand of an existing user has been determined, the processor 12 can retrieve user information related to that hand in step 90.

When the new hand press represents a new user, processor 12 can validate the hand press by matching hand metrics with those in database 18 or by obtaining other metrics in step 92. These other metrics can be like those obtained in step 48 of FIG. 2 that will validate the new user as a known user or unknown user.

In step 94, processor 12 determines if the combined new hand metrics and other metrics represent a previously known or recognized user, as previously discussed with relation to step 50 of FIG. 2. If the new hand press represents a known user, user info can be retrieved from database 18 in step 96. If the new hand press is from an unknown user, the user can be accepted or rejected based on the hand metrics and, optionally, other metrics in step 98. Rejected users are excluded from system access in step 100. User information or other user data can be established in step 102 for accepted users to allow them to become known or recognized users. Step 102 can include obtaining necessary user information and preferences which is stored in database 18 as other user data. Processing continues for known and accepted users in step 104.

Figure 5:
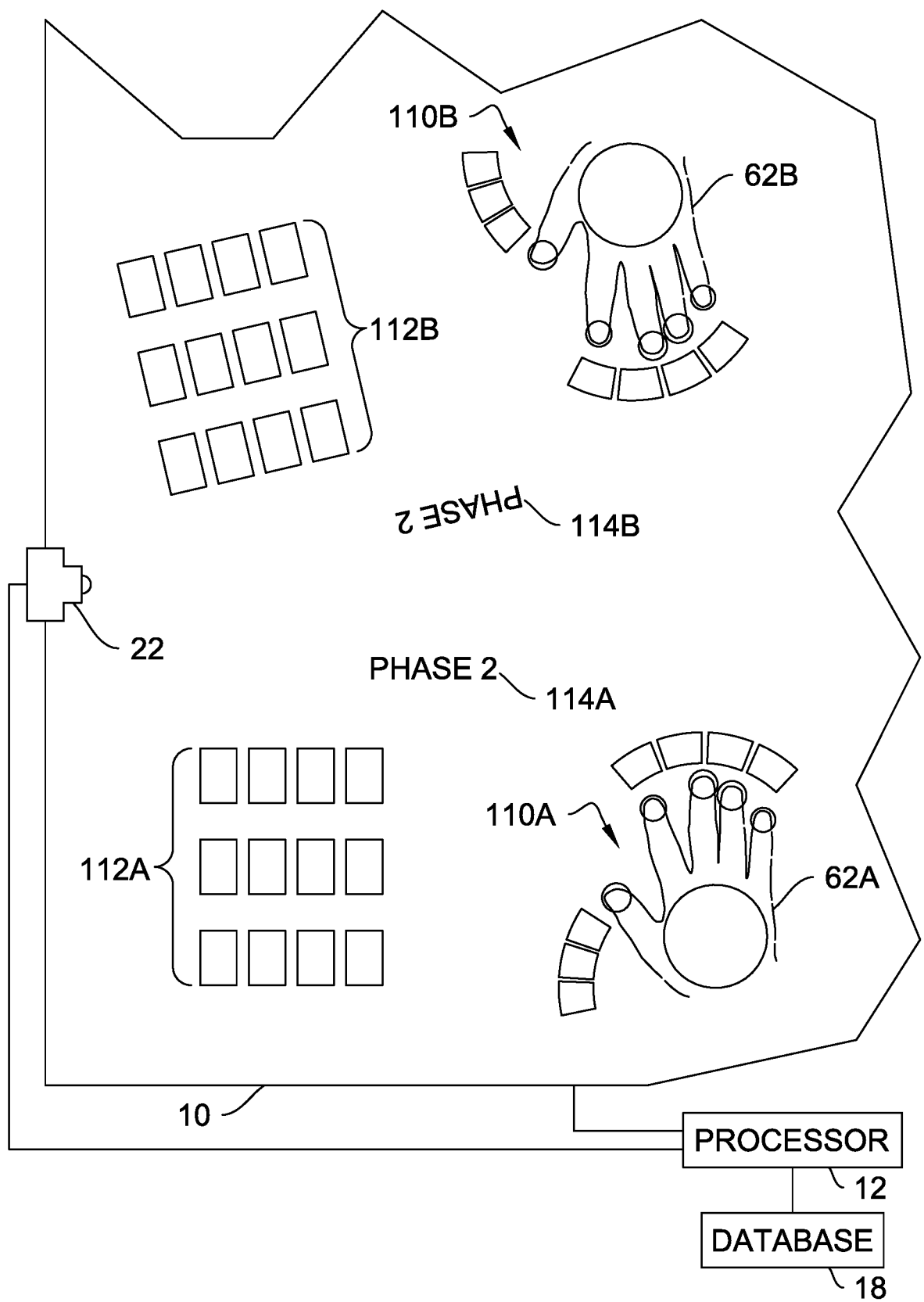
FIG. 5 is a diagram of an embodiment of the multi-hand interface for use by multiple users.

FIG. 5 shows multi-touch display 10 having a database 18 and other identification means 22 being used by multiple users. Processor 12 reads display touches when a first user places a hand 62A on display 10. Other identification means 22 can be a camera that identifies a user by facial features. In response, processor 12 instructs display 10 to display a first-hand menu 110A. Processor 12 can also show another controls such as button array 112A. Messages can be oriented by processor 12 and displayed as at 114A. Processor 12 can read display touches indicating that a second user has placed a hand 62B on display 10. In response, processor 12 can instruct display 10 to show a second-hand menu 110B, button array 112B, and a message 114B. Displays related to additional hand 62B of additional user are all oriented in response to the positioning of second hand 62B.

Processor 12 is configured to read each recognized full hand as a different user. Hand 62A or 62B can be either the user's right or left hand, and it can be oriented at any angle.

Processor 12 determines right or left hand and the orientation. Button array 112A is positioned by processor 12 based on the hand and orientation. This control 112A is tailored for use of user's opposite hand. It can be any kind of control known in the art. Controls 112A and 112B can be positioned in a predetermined location relative to hand 62A or 62B, as repositioned by the associated user, or in a user configured position saved in database 18. Logic can be used by processor 12 to avoid showing overlapping controls, or to display a message suggesting user repositioning when overlapping controls could occur. Many other types of second hand controls can be displayed including selection rings, sliders, and the like. Other display information, such as text "PHASE 2" at 114A, can be oriented according to the hand orientation. This allows multiple users to work together around the same multi-touch display 10.

Multiple users can work in collective mode where each user's actions affect the controls of the other user or in an independent mode wherein users cannot affect each other's controls and objects. In independent mode, it may be important to associate a user's right and left hand so that a user first hand controls the hand menu and the user second hand controls a tool or control that is associated with the user first hand menu. By associating a user's two hands, a user can work independently on a selected layer or multiple users can work collaboratively by each selecting the same layer. Administrative powers can be granted to a particular user allowing that user to manipulate all controls and objects.

Independent operation can also be achieved by using the hand menu such as 110A or 110B to place virtual objects close to the selecting hand menu. The virtual object can be identified with the selecting hand menu by a label, color coding, or other visual means. Any user can then manipulate the virtual object, but the object will be "owned" by the user at the selecting hand menu. The selecting hand menu can be applied to change properties of the object by direct entry. Manipulation can include dragging using a single finger gesture, twisting using a two finger gesture, scaling using a two finger gesture, or other gestures known in the art.

Registering two hands to a user can be done by several different means. Proximity of right and left hands can be used for this. A gesture can also be used by positioning the hands together and moving them apart. This can be done by registering a user's fingerprints. Using a finger print reader or multi-touch display capable of reading finger prints could be the other identification means 22 of FIG. 1. In a setup phase, user places both her hands on display 10 and processor 12 reads the fingerprints from the hand. User then selects a menu hand and a tool hand. In use, display 10 and processor 12 read fingerprints in order to associate hands with a single user and with user preferences stored in processor 12.

Two hands can be registered by a visual system that includes a camera 22 joined to processor 12. Camera 22 is positioned to view users around display 10 and communicate this image to processor 12. Processor 12 uses a neural network, machine learning, or another technique to determine the relationship between user position from camera 22 image and hands 62A and 62B. For example, camera 22 can provide an image of the display and the surrounding area to a machine learning network. This machine learning network can also be linked to receive multi-touch display locations. Training on many images can teach this type of network to distinguish between one user with two hands on the display and two users each having one hand on the display.

Figure 6:
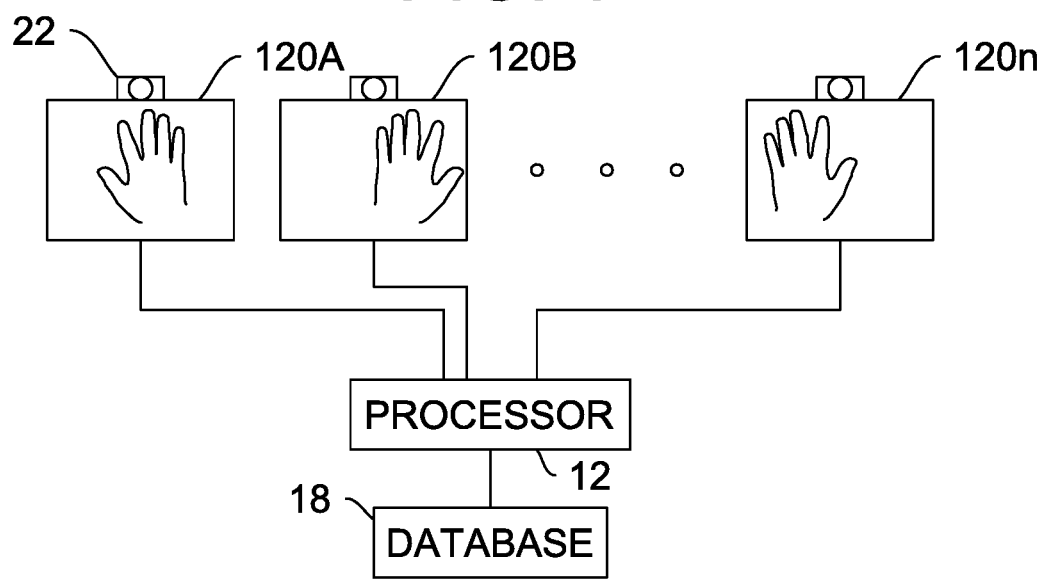
FIG. 6. is another embodiment of the multi-hand interface system.

FIG. 6 shows an embodiment allowing use of the method on multiple multi-touch displays 120A, 120B, . . . , 120n. These displays 120A, 120B, . . . , 120n can be networked to processor 10. Each display such as 120A can be provided with an other identification device 22. Processor 10 can be joined to a database 18. It should be understood that inputs from displays 120A, 120B, . . . , 102n can be shown on that display or another display.

A system and method shown herein can be used for many purposes. One such purpose could be a collaborative planning table wherein each user can contribute by moving objects on the table. This can also be applied as a gaming table where each user has virtual objects that she or he control.

Another application is the use of a large multi-touch display on defense platforms or ships as a horizontally-mounted large-format workstation display. This is inspired from the futuristic "wardroom table" concept of outfitting a submarine wardroom table with a multi-touch surface. This presents an environment where multiple users from a known pool of users can quickly "log on" and "log off" the system without using traditional authentication systems. Authenticated operations could include mirroring control room displays as well as pulling up and manipulating large format charts/maps, as well as communication data.

Other variations of configuration are mentioned within the description, such as using multiple displays. It should be understood that the figures are just one particular embodiment whereby the invention may be practiced and other configurations are possible as is apparent to one skilled in the art.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A method for multi-user recognition for a multi-touch display joined to a processor comprising the steps of:
   providing a multi-touch display joined to a processor;
   providing a processor having a database with stored user data therein, the stored user data for each user comprising user hand metrics and other user data;
   identifying a hand press on the multi-touch display;
   generating hand metrics from the identified hand press wherein the generated hand metrics comprise multi-touch display location, hand orientation, hand configuration, and hand dimensions;
   comparing generated hand dimensions with user hand metrics in the database to determine if the hand metrics match those in the database;
   requesting further user identification if the hand metrics fail to match those in the database;
   identifying the hand press as a hand press from a recognized user if the hand metrics match the hand metrics for the user in the database with a specified tolerance;
   retrieving other user data from the database based on the recognized user;

identifying an additional hand press on the multi-touch display;
generating additional hand metrics from the identified additional hand press wherein additional hand metrics include additional multi-touch display location, additional hand orientation, additional hand configuration, and additional hand dimensions;
determining if the additional hand metrics indicate an additional user or an additional hand of the recognized user;
associating the additional hand press with the recognized user if the additional hand metrics indicate an additional hand of the recognized user;
comparing generated hand dimensions if the additional hand metrics indicate an additional user to determine if the additional hand metrics match those in the database;
requesting further user identification if the additional hand metrics fail to match those in the database;
identifying the additional hand press as a hand press from a recognized additional user if the additional hand metrics match the hand metrics in the database with a specified tolerance;
determining an additional user data record in the database based on the recognized additional user; and
retrieving other user data from the database based on the recognized additional user.

2. The method of claim 1 wherein the step of determining if the additional hand metrics indicate an additional user utilizes the additional hand configuration in concert with the recognized user hand configuration to determine if the additional hand press must be associated with an additional user.

3. The method of claim 1 wherein the step of determining if the additional hand metrics indicate an additional user utilizes the additional multi-touch display location in concert with the recognized user multi-touch display location to determine if the additional hand press must be associated with an additional user.

4. The method of claim 1 wherein the step of determining if the additional hand metrics indicate an additional user utilizes the additional hand orientation in concert with the recognized user hand orientation to determine if the additional hand press must be associated with an additional user.

5. The method of claim 1 wherein the step of determining if the additional hand metrics indicate an additional user comprises:
utilizing the additional hand configuration in concert with the recognized user hand configuration to determine if the additional hand press must be associated with an additional user;
utilizing the additional hand position in concert with the recognized user hand position to determine if the additional hand press is likely to be associated with an additional user;
utilizing the additional hand orientation in concert with the recognized user hand orientation to determine if the additional hand press is likely to be associated with an additional user; and
utilizing additional hand metrics in concert with stored user hand metrics to determine if the additional hand press is likely to be associated with an additional user after the steps of utilizing the additional hand configuration, utilizing the additional hand position and utilizing the additional hand orientation.

6. The method of claim 1 wherein the step of determining if the additional hand metrics indicate an additional user or an additional hand indicates an additional hand of the recognized user when the additional multi-touch display location is within a predetermined distance from the multi-touch display location of the recognized user hand press.

7. The method of claim 1 further comprising maintaining the additional hand press association with the recognized user as the additional multi-touch display location is dragged on the multi-touch display.

8. The method of claim 1 further comprising the steps of maintaining the association between the additional hand press and the recognized user hand if the additional hand press is dragged on the multi-touch display to a multi-touch display location within a predetermined distance from the multi-touch display location of the recognized user hand press.

9. The method of claim 1 further comprising the steps of:
providing a biometric identification device joined to the processor to provide biometrics to the processor;
receiving biometrics from the biometric identification device; and
comparing biometrics with biometric information stored in the database wherein said step of requesting further user identification is executed if the hand metrics fail to match the hand metrics in the database, the biometrics fail to match biometric information in the database, or if both the hand metrics and biometrics fail to match the metrics in the database.

10. The method of claim 9 wherein the biometric identification device is a camera joined to the processor and the biometrics are facial features.

11. The method of claim 9 wherein the biometric identification device is a fingerprint reader joined to the processor and the biometrics are fingerprint features.

12. The method of claim 11 wherein the fingerprint reader is a region of the multi-touch display.

13. The method of claim 9 wherein the biometric identification device is a microphone joined to the processor and the biometrics are voice features.

14. The method of claim 1 further comprising the steps of:
providing a non-biometric user identification device joined to the processor;
receiving non-biometric user identification data from the non-biometric user identification device;
comparing non-biometric user identification data with other user data; and
utilizing the non-biometric user identification data in the step of identifying the hand press as a hand press from a recognized user.

15. The method of claim 14 wherein the non-biometric user identification device is a card reader.

16. The method of claim 14 wherein the non-biometric user identification device is a pass code reader.

* * * * *